(12) United States Patent
Ma et al.

(10) Patent No.: US 11,994,719 B2
(45) Date of Patent: May 28, 2024

(54) POLYMER WAVEGUIDE AND ELECTRICAL SIGNAL TRANSMISSION METHOD

(71) Applicant: Huawei Technologies Co., Ltd., Shenzhen (CN)

(72) Inventors: Jingyan Ma, Shenzhen (CN); Zhuang Zhao, Dongguan (CN); Changsong Xie, Munich (DE); Xiaolu Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 17/650,291

(22) Filed: Feb. 8, 2022

(65) Prior Publication Data
US 2022/0163726 A1 May 26, 2022

Related U.S. Application Data

(63) Continuation of application No. PCT/CN2020/097299, filed on Jun. 20, 2020.

(30) Foreign Application Priority Data

Aug. 9, 2019 (CN) .......................... 201910736557.4

(51) Int. Cl.
*G02B 1/04* (2006.01)
*G02B 6/122* (2006.01)
(Continued)

(52) U.S. Cl.
CPC ......... *G02B 6/29376* (2013.01); *G02B 1/045* (2013.01); *G02B 6/122* (2013.01);
(Continued)

(58) Field of Classification Search
CPC ...... G02B 1/045; G02B 6/122; G02B 6/1221; G02B 6/26; G02B 6/28; G02B 6/29376;
(Continued)

(56) References Cited

U.S. PATENT DOCUMENTS 9,588,255 B1   3/2017 Tassin et al.
9,601,820 B2 * 3/2017 Herbsommer .......... H01P 3/122
(Continued)

FOREIGN PATENT DOCUMENTS

CN   1294690 A   5/2001
CN   1400764 A   3/2003
(Continued)

OTHER PUBLICATIONS

Ma, T. et al., "Dispersion Compensation in The Fiber-based Terahertz Communication Links", IEEE International Conference Onubiquitous Wireless Broadband (ICUWB), Oct. 4, 2015, 6 Pages.
(Continued)

*Primary Examiner* — Ryan A Lepisto
(74) *Attorney, Agent, or Firm* — Slater Matsil, LLP

(57) ABSTRACT

A polymer waveguide and an electrical signal transmission method are disclosed. In a specific implementation, the polymer waveguide includes at least a section of transmission waveguide and a section of dispersion compensation waveguide. The transmission waveguide is connected to the dispersion compensation waveguide. Dispersion symbols of the dispersion compensation waveguide and the transmission waveguide are opposite.

17 Claims, 4 Drawing Sheets

(51) Int. Cl.
*G02B 6/26* (2006.01)
*G02B 6/28* (2006.01)
*G02B 6/293* (2006.01)
*G02B 6/30* (2006.01)
*H04B 10/90* (2013.01)
*G02F 1/01* (2006.01)

(52) U.S. Cl.
CPC ............ *G02B 6/1221* (2013.01); *G02B 6/26* (2013.01); *G02B 6/28* (2013.01); *G02B 6/305* (2013.01); *H04B 10/90* (2013.01); *G02B 6/29395* (2013.01); *G02F 1/0147* (2013.01)

(58) Field of Classification Search
CPC ... G02B 6/29395; G02B 6/305; G02F 1/0147; H04B 10/90
See application file for complete search history.

(56) References Cited

U.S. PATENT DOCUMENTS

| | | | |
|---|---|---|---|
| 2003/0053197 A1 | 3/2003 | Shigematsu et al. | |
| 2003/0185574 A1 | 10/2003 | Inada | |
| 2004/0190840 A1 | 9/2004 | Deutsch et al. | |
| 2016/0064795 A1 | 3/2016 | Chang et al. | |
| 2019/0319328 A1* | 10/2019 | Dogiamis | H03H 11/04 |
| 2019/0379097 A1* | 12/2019 | Dogiamis | H01P 3/16 |

FOREIGN PATENT DOCUMENTS

| | | |
|---|---|---|
| CN | 1411167 A | 4/2003 |
| CN | 1445568 A | 10/2003 |
| CN | 1447137 A | 10/2003 |
| CN | 1497279 A | 5/2004 |
| CN | 102162876 A | 8/2011 |
| CN | 104536083 A | 4/2015 |
| CN | 105911649 A | 8/2016 |
| CN | 109417212 A | 3/2019 |
| JP | 3764032 B2 | 4/2006 |
| WO | 2018125227 A1 | 7/2018 |
| WO | 2018125228 A1 | 7/2018 |

OTHER PUBLICATIONS

Ma., T. et al., "Analog signal processing in the terahertz communication links using waveguide Bragg gratings: example of dispersion compensation", Optics Express, May 15, 2017, 16 pages, vol. 25, No. 10.

Ling, F. et al., "A broadband tunable terahertz negative refractive index metamaterial", Scientific Reports, Dec. 1, 2018, 10 pages, vol. 8, No. 1.

* cited by examiner

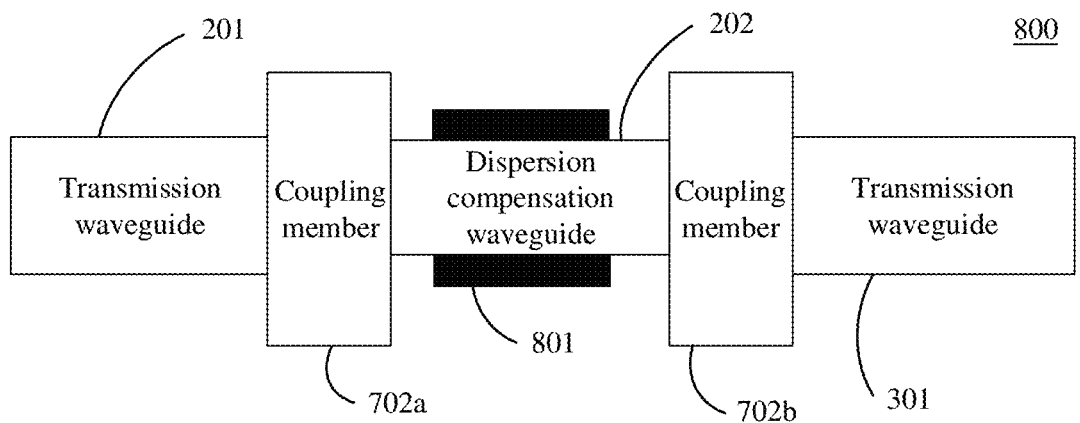

FIG. 9

```
Receive an electrical signal from one end of a polymer waveguide, where      ─ 901
the polymer waveguide includes a first waveguide and a dispersion
compensation waveguide, the first waveguide is connected to the
dispersion compensation waveguide, and dispersion symbols of the
dispersion compensation waveguide and the first waveguide are opposite ↓
                                                                             ─ 903
Transmit the electrical signal in a transmission direction of the polymer
                              waveguide ↓
                                                                             ─ 905
Output the electrical signal from the other end of the polymer waveguide
```

FIG. 10

POLYMER WAVEGUIDE AND ELECTRICAL SIGNAL TRANSMISSION METHOD

CROSS-REFERENCE TO RELATED APPLICATIONS

This application is a continuation of International Application No. PCT/CN2020/097299, filed on Jun. 20, 2020, which claims priority to Chinese Patent Application No. 201910736557.4, filed on Aug. 9, 2019. The disclosures of the aforementioned applications are hereby incorporated by reference in their entireties.

TECHNICAL FIELD

The present invention relates to the field of waveguide components, and in particular, to a polymer waveguide and an electrical signal transmission method.

BACKGROUND

A polymer waveguide is also referred to as a plastic waveguide, and has advantages such as a low loss and a low cost on a terahertz (THz) frequency band. In recent years, the polymer waveguide has received wide attention in the THz communications field. Compared with a large loss of a conventional coaxial cable on an extreme high frequency (EHF) band, the polymer waveguide has a lower loss due to no skin effect. In addition, the polymer waveguide is characterized by flexibility and bendability compared with a conventional hard metal waveguide tube.

When the polymer waveguide is used for interconnection between THz transceivers, a data transmission rate of the polymer waveguide depends on magnitude of dispersion of a transmission medium, namely, a dispersion value of the polymer waveguide. A polymer waveguide with lower dispersion brings a higher data transmission rate. Currently, a polymer waveguide used in a transceiver system has a single structure, for example, a solid structure or a hollow structure. Dispersion values of waveguides having these structures are relatively large, and consequently an increase in a data transmission rate is greatly limited.

The dispersion of the polymer waveguide mainly includes waveguide dispersion, material dispersion, and mode dispersion. In the conventional technology, a single-mode waveguide is used to filter out a higher order mode in the polymer waveguide, to reduce the mode dispersion of the polymer waveguide. Waveguide dispersion and the material dispersion of the polymer waveguide cannot be changed, and thus this solution has limited capability to reduce total dispersion of the polymer waveguide.

SUMMARY

Embodiments of this application provide a polymer waveguide and an electrical signal transmission method, to effectively reduce total dispersion of the polymer waveguide, thereby increasing a data transmission rate of the polymer waveguide.

According to a first aspect, an embodiment of this application provides a polymer waveguide. The polymer waveguide includes a first waveguide and a dispersion compensation waveguide. The first waveguide is connected to the dispersion compensation waveguide, and dispersion symbols of the dispersion compensation waveguide and the first waveguide are opposite.

The polymer waveguide is formed by connecting a plurality of waveguides with complementary dispersion performance, to transmit an electrical signal. In the technical solution provided in this embodiment, total dispersion of the polymer waveguide is effectively reduced, so that the polymer waveguide can support electrical signal transmission at a higher rate.

In a possible design, the polymer waveguide further includes a second waveguide, the second waveguide is connected to the dispersion compensation waveguide, and dispersion symbols of the second waveguide and the first waveguide are the same. With a multi-section design, the polymer waveguide can support more application scenarios, thereby reducing its cost.

In a possible design, the dispersion compensation waveguide includes a plurality of waveguides connected in parallel or a plurality of waveguides connected in series. An advantage thereof is that a dispersion value of the dispersion compensation waveguide can be flexibly changed to meet requirements in different scenarios.

In a possible design, the following plurality of connection manners may be used to connect adjacent waveguides.

In a possible implementation, at least one end of the dispersion compensation waveguide includes a coupling part, and the coupling part is configured to couple a waveguide adjacent to the dispersion compensation waveguide. A transmission loss can be reduced by implementing a connection by using the coupling part.

In another possible implementation, the polymer waveguide includes a coupling member, and the foregoing adjacent waveguides are connected to each other by using the coupling member. Specifically, the waveguides and the coupling member are integrally produced, and the coupling member has a shape-tapered or structure-tapered design. The coupling member adapts to a connection between a transmission waveguide and the dispersion compensation waveguide that have different sizes, thereby helping reduce a signal transmission loss.

In still another possible implementation, the coupling member has a detachable structure. In this design, flexibility of the polymer waveguide can be improved.

In a possible design, the dispersion value of the dispersion compensation waveguide may be changed in one or more of the following manners to provide better application flexibility:

In a possible implementation, the polymer waveguide further includes a mechanical displacement control member, the dispersion compensation waveguide is in contact with the mechanical displacement control member, and the mechanical displacement control member is configured to change the dispersion value of the dispersion compensation waveguide.

In another possible implementation, the polymer waveguide further includes a heating member, and the heating member is configured to change the dispersion value of the dispersion compensation waveguide.

According to a second aspect, an embodiment of this application provides an electrical signal transmission method, where the method includes the following steps: receiving an electrical signal from one end of a polymer waveguide, where the polymer waveguide includes a first waveguide and a dispersion compensation waveguide, the first waveguide is connected to the dispersion compensation waveguide, and dispersion symbols of the dispersion compensation waveguide and the first waveguide are opposite; transmitting the electrical signal in a transmission direction of the polymer waveguide; and outputting the electrical signal from the other end of the polymer waveguide.

It should be noted that the polymer waveguide in the foregoing method may be replaced with the polymer waveguide described in the first aspect or any specific design or implementation of the first aspect.

In a specific design, the foregoing method further includes: adjusting a dispersion value of the dispersion compensation waveguide. Specifically, the dispersion value of the dispersion compensation waveguide may be changed by changing a shape of the dispersion compensation waveguide or heating the dispersion compensation waveguide.

According to a third aspect, an embodiment of this application provides a communications system. The system includes two apparatuses and the polymer waveguide mentioned in the first aspect or any design or implementation of the first aspect. The two apparatuses are connected by using the polymer waveguide. Specifically, the two apparatuses may be chips, antennas, data communications devices, or the like.

Compared with the conventional technology, according to the polymer waveguide disclosed in this application, waveguides with complementary dispersion performance are connected, to reduce a total dispersion value of the polymer waveguide, so that a maximum signal transmission rate that can be supported by the polymer waveguide can be effectively increased.

BRIEF DESCRIPTION OF THE DRAWINGS

FIG. 9 is a schematic structural diagram of a seventh polymer waveguide according to an embodiment of this application; and FIG. 10 is a schematic flowchart of an electrical signal transmission method according to an embodiment of this application.

DETAILED DESCRIPTION OF ILLUSTRATIVE EMBODIMENTS

A device form and a service scenario that are described in embodiments of this application are intended to describe technical solutions in the embodiments of the present invention more clearly, and do not constitute a limitation on the technical solutions provided in the embodiments of the present invention. A person of ordinary skill in the art may learn that, as the device form evolves and a new service scenario appears, the technical solutions provided in the embodiments of this application are also applicable to a similar technical problem.

Figure 1:
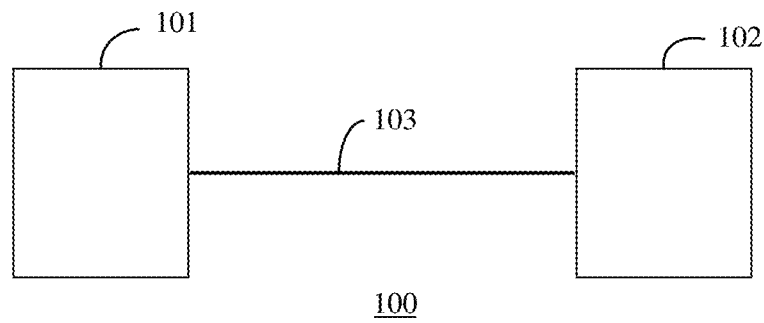
FIG. 1 is a schematic diagram of an application scenario according to this application.

The technical solutions provided in this application may be applied to a scenario of transmitting an electrical signal within a relatively short distance, for example, a data center, chip interconnection, and the internet of vehicles. FIG. 1 is a schematic diagram of an application scenario according to this application. As shown in FIG. 1, a system 100 includes two apparatuses (101 and 102) and a polymer waveguide 103. In the system, the polymer waveguide 103 is configured to implement interconnection between the two apparatuses 101 and 102, that is, support electrical signal transmission between the two apparatuses. Specifically, this application mainly focuses on transmitting an electrical signal on a relatively high frequency band, for example, transmitting a signal on a THz (covering 0.1 THz to 10 THz) band.

Usually, a distance between the two apparatuses is relatively short, for example, within 10 meters. Specifically, the apparatuses 101 and 102 may be two ports of one device or two different devices. For example, the apparatuses 101 and 102 may be two ports of different subracks of a same device in a data center. For another example, the apparatuses 101 and 102 may be two screens, to implement 4 K/8 K high-definition data transmission by using the polymer waveguide. In addition, the foregoing two apparatuses each may be a chip or a component (for example, an antenna) in the chip. It should be noted that the polymer waveguide 103 is not necessarily in direct physical contact with the two apparatuses (101 and 102). For example, when two antennas are connected by using the polymer waveguide 103, an end face of the polymer waveguide is relatively close to or is in direct contact with a main radiation surface of the antenna. A specific form of the apparatus is not limited in this application. The polymer waveguide provided in this application may be configured to transmit an electrical signal in the foregoing different scenarios.

It should be noted that the terms "first", "second", and the like in this application are intended to distinguish between similar objects but do not necessarily indicate a specific order or sequence. It should be understood that the terms are interchangeable in a proper circumstance so that the embodiments described herein can be implemented in an order not described in this application. The term "and/or" is used to describe an association relationship for describing associated objects and represents that three relationships may exist. For example, A and/or B may represent the following cases: Only A exists, both A and B exist, and only B exists. A specific operation method in a method embodiment may also be applied to an apparatus embodiment. On the contrary, function descriptions of a component in the apparatus embodiment are also applicable to related descriptions in the method embodiment.

It should be further noted that, unless otherwise specified, specific descriptions of some technical features in an embodiment may also be applied to explaining corresponding technical features mentioned in another embodiment. For example, specific descriptions of a dispersion compensation waveguide in an embodiment may be applied to descriptions of a corresponding waveguide in another embodiment. For another example, a specific implementation of a coupling member in an embodiment may be applied to a coupling member in another embodiment. In addition, to reflect a relationship between components in different embodiments more clearly, same or similar reference numerals are used in this application to represent components that have same or similar functions in different embodiments.

In addition, a connection mentioned in this application may be a direct connection or an indirect connection. For a specific connection relationship, refer to descriptions in subsequent corresponding embodiments and accompanying drawings. Unless otherwise specified, the "connection" should not be understood restrictively.

Figure 2:
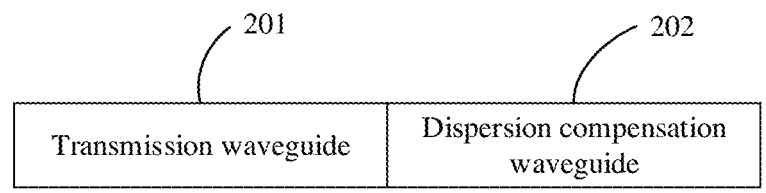
FIG. 2 is a schematic structural diagram of a first polymer waveguide according to this application.

FIG. 2 is a schematic structural diagram of a first polymer waveguide according to this application. The polymer waveguide 200 includes a transmission waveguide 201 and a dispersion compensation waveguide 202.

The transmission waveguide 201 is connected to the dispersion compensation waveguide 202. In a possible implementation, the two waveguides may be connected to each other by using adhesive tape or glue. Specifically, the glue may be polyester glue, polyurethane glue, or epoxy resin glue. In another possible implementation, the dispersion compensation waveguide 202 may include a coupling part, and is connected to the transmission waveguide 201 by using the coupling part. In still another possible implementation, the two waveguides may be connected by using a coupling member. For more related descriptions, refer to subsequent embodiments and related accompanying drawings. Details are not described herein.

Dispersion symbols of the dispersion compensation waveguide 202 and the transmission waveguide 201 are opposite. It should be noted that opposite symbols mean that symbols of two numerical values are different. Specifically, one value is a positive number (+), and the other value is a negative number (−). For example, a waveguide with dispersion of +5 ps/GHz/m (+5 ps/GHz/m) is used as the dispersion compensation waveguide, and another waveguide with dispersion of −1 ps/GHz/m (−1 ps/GHz/m) is used as the transmission waveguide. For another example, a waveguide with dispersion of −1.8 ps/GHz/m is used as the dispersion compensation waveguide, and another waveguide with dispersion of +3 ps/GHz/m is used as the transmission waveguide. It should be noted that ps means picosecond, GHz means gigahertz, and m means meter. It should be noted that "dispersion symbols are the same" may also mean that dispersion values have a same symbol, and "dispersion symbols are opposite" may also mean that dispersion values have opposite symbols or dispersion symbols are different.

It should be understood that the transmission waveguide is a waveguide mainly configured to transmit an electrical signal. Usually, a transmission loss of the transmission waveguide is relatively low. The dispersion compensation waveguide is configured to perform dispersion compensation, that is, enable total dispersion of the polymer waveguide to be close to 0.

The polymer waveguide is formed by connecting a plurality of waveguides with complementary dispersion performance, to transmit an electrical signal. In the technical solutions provided in this application, dispersion performance of the polymer waveguide can be effectively improved, so that an upper limit of a data transmission rate supported by the polymer waveguide can be increased, that is, electrical signal transmission at a higher rate can be supported.

The following further describes the embodiments of this application in detail with reference to more accompanying drawings and based on common aspects of the polymer waveguide described above. It should be noted that a material used in the waveguide shown in FIG. 2 is a polymer. The polymer mentioned in this application is a macromolecular compound. Usually, a molecular mass of the macromolecular compound is up to several thousands to several millions. Specifically, the material may be a material such as polytetrafluoroethylene (PTFE), polyethylene (PE), and cyclic olefin copolymer (COC). It should be understood that, a new material may be used for the polymer waveguide as technologies develop. This is not specifically limited in this application.

Figure 3:
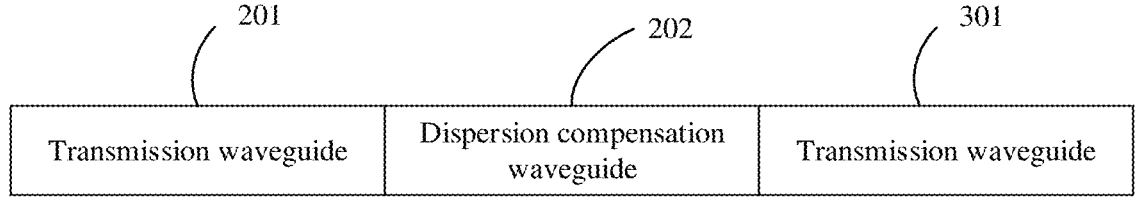
FIG. 3 is a schematic structural diagram of a second polymer waveguide according to an embodiment of this application.

FIG. 3 is a schematic structural diagram of a second polymer waveguide according to an embodiment of this application. The polymer waveguide 300 includes a transmission waveguide 201, a dispersion compensation waveguide 202, and a transmission waveguide 301. Adjacent waveguides are connected to each other. That is, the transmission waveguide 201 is connected to the dispersion compensation waveguide 202, and the dispersion compensation waveguide 202 is connected to the transmission waveguide 301. Dispersion symbols of the two transmission waveguides are the same. A dispersion symbol of the dispersion compensation waveguide is different from the dispersion symbol of the transmission waveguide. The two transmission waveguides may be respectively referred to as a first waveguide and a second waveguide.

It should be understood that the polymer waveguide 300 in this embodiment may include a multi-section dispersion compensation waveguide 202.

For example, the dispersion compensation waveguide 202 includes a plurality of dispersion compensation waveguides connected in series. A dispersion compensation waveguide (hereinafter referred to as a standard dispersion compensation waveguide briefly) with a fixed dispersion value is designed, and a specific quantity of standard dispersion compensation waveguides are connected in series based on a target dispersion value required by the polymer waveguide, to adjust the polymer waveguide to achieve the target dispersion value. In this design, a production process can be simplified and a waveguide production cost can be reduced.

For another example, the dispersion compensation waveguide includes a plurality of dispersion compensation waveguides connected in parallel. The dispersion compensation waveguides connected in parallel may also be referred to as a composite dispersion compensation waveguide. One or more of the waveguides connected in parallel may be replaced to change a dispersion value of the composite dispersion compensation waveguide, to achieve target dispersion of the polymer waveguide.

Alternatively, the polymer waveguide may include three or more transmission waveguides, and a dispersion compensation waveguide is disposed between every two transmission waveguides.

It should be understood that a total length of the dispersion compensation waveguides should be less than a total length of the transmission waveguides. Usually, the total length of the dispersion compensation waveguides should be far less than the total length of the transmission waveguides. For example, the total length of the dispersion compensation waveguides is one third of the total length of the transmission waveguides, or is a smaller length. An advantage thereof is that an overall transmission loss of the polymer waveguide may be relatively low, thereby helping improve transmission performance of the polymer waveguide. It should be noted that the total length means that a plurality of waveguides of a same type exist. If there is only one waveguide of one type, a total length of the waveguide is understood as a length of the waveguide.

It should be noted that a connection manner in this embodiment may be the manner described in the related embodiment in FIG. 2, or may be a manner mentioned in another subsequent embodiment and the accompanying drawings. Details are not described herein.

It should be further noted that the waveguide in this application may be a hollow waveguide or a solid waveguide. Unless otherwise specified, this is not limited in this application.

Figure 4:
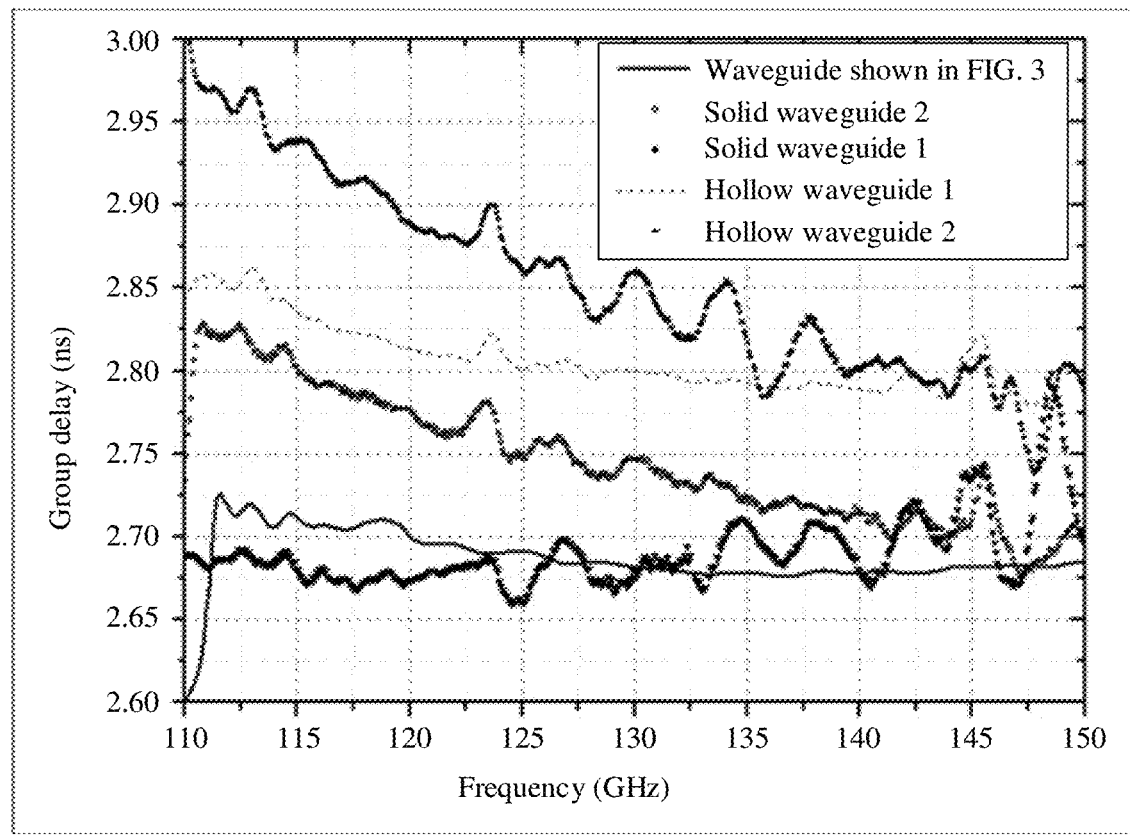
FIG. 4 is a schematic diagram of a test result of dispersion performance of the waveguide shown in FIG. 3.

FIG. 4 is a schematic diagram of a test result of dispersion performance of the waveguide shown in FIG. 3. In FIG. 4, a horizontal coordinate is a signal frequency range (in a unit of GHz), and a vertical coordinate is a group delay (in a unit of nanosecond (ns)). A person skilled in the art may learn that a slope of a group delay curve is used to reflect dispersion performance of a waveguide. A flatter group delay curve indicates that dispersion is closer to 0 (that is, dispersion performance is better). A diameter of a solid waveguide 1 is 3 mm (mm). A diameter of a solid waveguide 2 is 2 mm. An inner/outer diameter of a hollow waveguide 1 is 1 mm/2 mm. An inner/outer diameter of a hollow waveguide 2 is 1.6 mm/2 mm. Lengths of the foregoing four waveguides are all 60 centimeters. In the waveguide shown in FIG. 3, the dispersion compensation waveguide is a solid waveguide with a length of 25 centimeters and a diameter of 3 mm. The first and second transmission waveguides each are a hollow waveguide with a length of 10 centimeters and an inner/outer diameter of 1.6 mm/2 mm. Adjacent waveguides are connected by using adhesive tape. It can be seen from FIG. 4 that, compared with a single-structure waveguide, the polymer waveguide shown in FIG. 3 has a significant characteristic of a smooth group delay, indicating that dispersion of the polymer waveguide is relatively low.

The polymer waveguide is formed by connecting a plurality of sections of waveguides with complementary dispersion performance, so that dispersion performance of the polymer waveguide provided in this embodiment is improved, that is, the polymer waveguide has a relatively good dispersion value, and can support a higher data transmission rate. In addition, a cost of the polymer waveguide can be reduced by using a flexible multi-section design.

Figure 5:
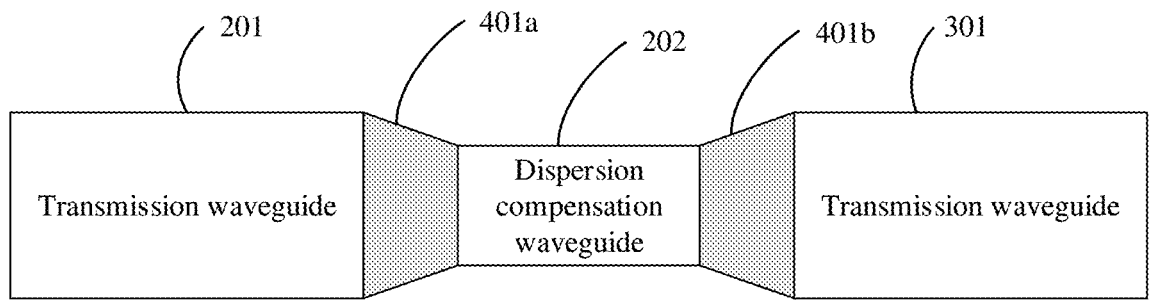
FIG. 5 is a schematic structural diagram of a third polymer waveguide according to an embodiment of this application.

FIG. 5 is a schematic structural diagram of a third polymer waveguide according to an embodiment of this application. The polymer waveguide 400 includes a transmission waveguide 201, a dispersion compensation waveguide 202, a transmission waveguide 301, and coupling members (401a and 401b). Adjacent waveguides are connected by using the coupling member. That is, the transmission waveguide 201 is connected to the dispersion compensation waveguide 202 by using the coupling member 401a, and the dispersion compensation waveguide 202 is connected to the transmission waveguide 301 by using the coupling member 401b. Dispersion symbols of the two transmission waveguides are the same. A dispersion symbol of the dispersion compensation waveguide is opposite to the dispersion symbol of the transmission waveguide. The two transmission waveguides may be respectively referred to as a first waveguide and a second waveguide.

Structures of the coupling members 401a and 401b have shape-tapered designs. That is, a diameter of the coupling member gradually decreases in a direction. For example, a diameter of the coupling member 401a is smaller in a direction from the first waveguide 201 to the dispersion compensation waveguide 202. For another example, a diameter of the coupling member 401b is larger in a direction from the dispersion compensation waveguide 202 to the second waveguide 301. The tapered design of the coupling member may adapt to a connection between the transmission waveguide and the dispersion compensation waveguide that have different sizes, thereby helping reduce a signal transmission loss.

It should be noted that relative sizes of the transmission waveguide and the dispersion compensation waveguide that are shown in FIG. 5 are merely examples. Alternatively, a diameter of the dispersion compensation waveguide may be greater than a diameter of the transmission waveguide.

Materials of the coupling members 401a and 401b may be the same as or different from materials of other waveguides. Specifically, the materials may be selected based on an actual design requirement. For example, if there is a material that is more suitable for a size-tapered design, the material may be considered when the coupling member is produced.

Optionally, the polymer waveguide shown in FIG. 5 may be integrally produced. That is, the polymer waveguide may be produced at one time by using a manufacturing process. In this integral production manner, no connection processing needs to be performed subsequently, thereby helping reduce a transmission loss of the polymer waveguide. It should be understood that various components of the polymer waveguide 400 may be connected in the connection manners mentioned in FIG. 2 and FIG. 3. This is not limited in this application.

Alternatively, optionally, the dispersion compensation waveguide 202 and the coupling member 401a and/or the coupling member 404b may be integrally designed. For example, the dispersion compensation waveguide 202 and the coupling member may be produced by using a same material. This solution may also be understood as follows: At least one end of the dispersion compensation waveguide 202 includes a coupling part. A part that needs to be coupled to the transmission waveguide may use the connection manners mentioned in FIG. 2 and FIG. 3 or another embodiment.

The polymer waveguide is formed by connecting a plurality of sections of waveguides with complementary dispersion performance, so that dispersion performance of the polymer waveguide provided in this embodiment is improved, that is, the polymer waveguide has a dispersion value closer to 0 (namely, better dispersion performance), and can support a higher data transmission rate. In addition, the transmission loss of the polymer waveguide can be reduced by connecting the waveguides by using the shape-tapered coupling member.

Figure 6:
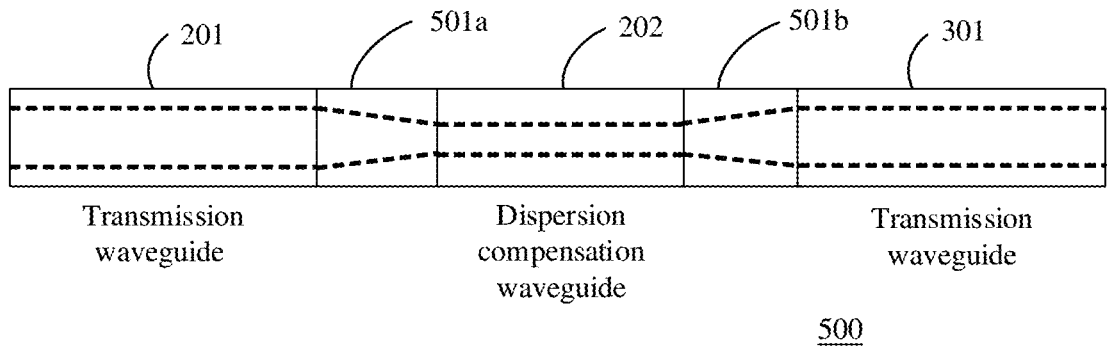
FIG. 6 is a schematic structural diagram of a fourth polymer waveguide according to an embodiment of this application.

FIG. 6 is a schematic structural diagram of a fourth polymer waveguide according to an embodiment of this application. The polymer waveguide 500 includes a transmission waveguide 201, a dispersion compensation waveguide 202, a transmission waveguide 301, and coupling members (501a and 501b). Adjacent waveguides are connected by using the coupling member. That is, the transmission waveguide 201 is connected to the dispersion compensation waveguide 202 by using the coupling member 501a, and the dispersion compensation waveguide 202 is connected to the transmission waveguide 301 by using the coupling member 501b. Dispersion symbols of the two transmission waveguides are the same. A dispersion symbol of the dispersion compensation waveguide is opposite to the dispersion symbol of the transmission waveguide. The two transmission waveguides may be respectively referred to as a first waveguide and a second waveguide. Structures of the coupling members 501a and 501b have internal-structure-tapered designs. That is, a size (shown by a dashed line in FIG. 6) of an inner hollow part of the coupling member gradually changes in a direction. For example, a diameter of a hollow part of the coupling member 501a is smaller in a direction from the first waveguide 201 to the dispersion compensation waveguide 202. For another example, a diameter of a hollow part of the coupling member 501b is larger in a direction from the dispersion compensation waveguide 202 to the second waveguide 301. The structure-tapered design of the coupling member can adapt to a structure difference between the transmission waveguide and the dispersion compensation waveguide, thereby helping reduce a transmission loss.

It should be noted that outer diameters and sizes of inner hollow parts of the waveguide and the coupling member that are shown in FIG. 6 are merely examples. In an actual design, a corresponding design may be used based on a specific requirement and a material characteristic. This is not limited in this application.

Similar to FIG. 5, optionally, the polymer waveguide shown in FIG. 6 may be integrally produced, thereby reducing the transmission loss of the polymer waveguide.

The polymer waveguide is formed by connecting a plurality of sections of waveguides with complementary dispersion performance, so that dispersion performance of the polymer waveguide provided in this embodiment is improved, that is, the polymer waveguide has a relatively good dispersion value, and can support a higher data transmission rate. In addition, the transmission loss of the polymer waveguide can be reduced by connecting the waveguides by using the internal-structure-tapered coupling member.

Figure 7:
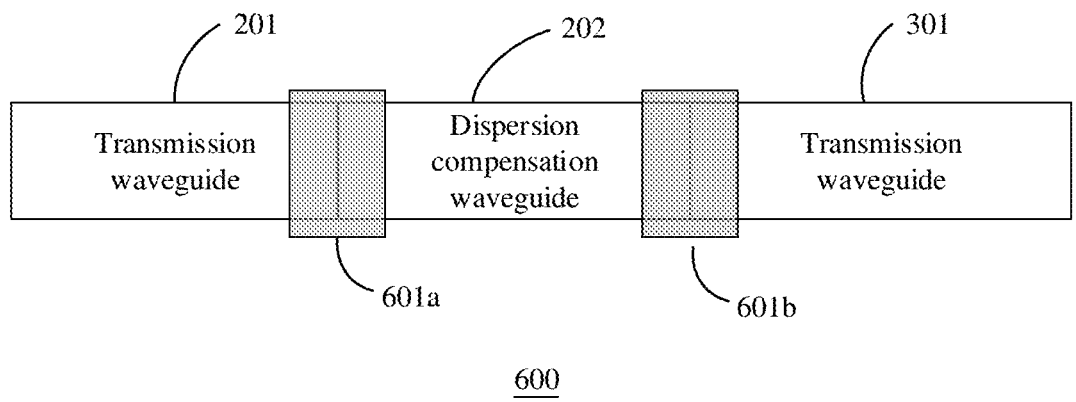
FIG. 7 is a schematic structural diagram of a fifth polymer waveguide according to an embodiment of this application.

FIG. 7 is a schematic structural diagram of a fifth polymer waveguide according to an embodiment of this application. The polymer waveguide 600 includes a transmission waveguide 201, a dispersion compensation waveguide 202, a transmission waveguide 301, and coupling members (601a and 601b). Adjacent waveguides are connected by using the coupling member. That is, the transmission waveguide 201 is connected to the dispersion compensation waveguide 202 by using the coupling member 601a, and the dispersion compensation waveguide 202 is connected to the transmission waveguide 301 by using the coupling member 601b. An outer diameter of each of the two coupling members is greater than an outer diameter of each of the foregoing waveguides. Dispersion symbols of the two transmission waveguides are the same. A dispersion symbol of the dispersion compensation waveguide is opposite to the dispersion symbol of the transmission waveguide. The two coupling members each have a detachable structure. In other words, inner diameters of two ends of the coupling member each may match an outer diameter of a corresponding waveguide. For example, an inner diameter of a left hollow part of the coupling member 601a matches an outer diameter of the transmission waveguide 201, that is, the inner diameter is basically the same as the outer diameter of the transmission waveguide 201. Therefore, the transmission waveguide can be fastened by using the coupling member. Similarly, an inner diameter of a right hollow part of the coupling member 601a may match an outer diameter of the dispersion compensation waveguide 202. Coupling connection is performed by using the coupling member with a detachable structure, so that a polymer waveguide with a specific dispersion value can be implemented in a flexible combination manner, thereby meeting requirements in different scenarios. The similar can be said for the coupling member 601b, and details are not described herein.

It should be noted that the inner diameters of the two ends of the coupling member are not necessarily the same, and may be designed based on a specific requirement. It should be further noted that the coupling member may have a totally hollow structure. In this case, after one end of the transmission waveguide and one end of the dispersion compensation waveguide are separately inserted into the coupling member, the transmission waveguide is in direct contact with the dispersion compensation waveguide. Alternatively, the coupling member may be hollow at the two ends, and has a solid structure of a specific length in the middle. In this way, after the transmission waveguide and the dispersion compensation waveguide are inserted into the coupling member, the transmission waveguide is not in direct contact with the dispersion compensation waveguide, but is connected to the dispersion compensation waveguide by using the foregoing solid part. Specifically, the solid structure may be the structure of the coupling member (401a or 501a) shown in FIG. 5 or FIG. 6, and two sections of waveguides are better connected by using the tapered design.

Optionally, at least one end of the dispersion compensation waveguide 202 may be designed with the coupling member shown in FIG. 7. This solution may be understood as follows: The dispersion compensation waveguide has a detachable coupling part. In this design, the dispersion compensation waveguide may be connected by flexibly replacing the transmission waveguide, thereby implementing a polymer waveguide with different total dispersion values.

The polymer waveguide is formed by connecting a plurality of sections of waveguides with complementary dispersion performance, so that dispersion performance of the polymer waveguide provided in this embodiment is improved, that is, the polymer waveguide has a relatively good dispersion value, and can support a higher data transmission rate. In addition, the waveguides are connected by using the detachable coupling member, so that flexibility of the polymer waveguide can be improved, and requirements in different application scenarios can be met.

Figure 8:
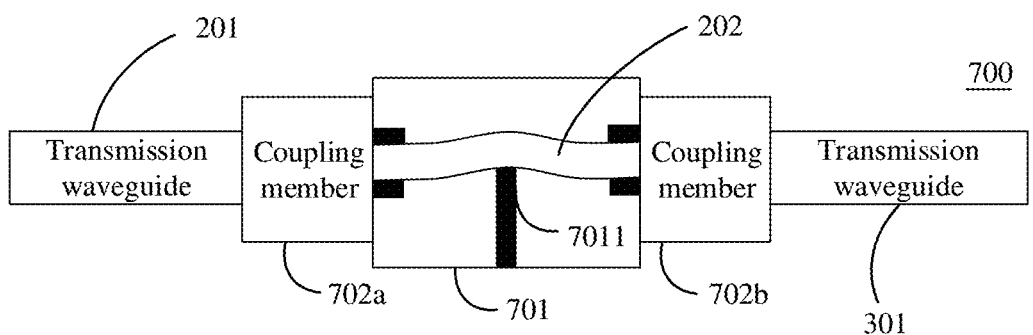
FIG. 8 is a schematic structural diagram of a sixth polymer waveguide according to an embodiment of this application.

FIG. 8 is a schematic structural diagram of a sixth polymer waveguide according to an embodiment of this application. The polymer waveguide 700 includes a transmission waveguide 201, a dispersion compensation waveguide 202, a transmission waveguide 301, coupling members (702a and 702b), and a mechanical displacement control member 701. Adjacent waveguides are connected by using the coupling member. Dispersion values of the two transmission waveguides have a same symbol. A dispersion value of the dispersion compensation waveguide and the dispersion value of the transmission waveguide have opposite symbols. The two coupling members may have any design in FIG. 5 to FIG. 7, and details are not described herein again.

Different from the foregoing three embodiments, the mechanical displacement control member 701 is added in this embodiment. The dispersion compensation waveguide is in contact with the mechanical displacement control member. The dispersion value of the dispersion compensation waveguide is changed by changing a shape of the dispersion compensation waveguide. As shown in FIG. 8, the mechanical displacement control member 701 includes an arm 7011 whose position can be adjusted. The dispersion compensation waveguide 202 may be bent to a specific extent by changing the position of the arm 7011 in a vertical direction, thereby changing the dispersion value of the dispersion compensation waveguide. An advantage thereof is that an overall dispersion value of the polymer waveguide can be flexibly adjusted to a specific extent without replacing a waveguide of the polymer waveguide. The polymer waveguide can be better reused to adapt to a change in a specific application environment, or to resolve a problem that a dispersion value does not meet an actual requirement due to an error between a theoretical design and actual application.

It should be noted that a control manner provided in this embodiment is only an example. The dispersion value may be adjusted in another manner such as extrusion or rotation. This is not limited in this application.

FIG. 9 is a schematic structural diagram of a seventh polymer waveguide according to an embodiment of this application. The polymer waveguide 800 includes a transmission waveguide 201, a dispersion compensation waveguide 202, a transmission waveguide 301, coupling members (702a and 702b), and a heating member 801. Adjacent waveguides are connected by using the coupling member. Dispersion values of the two transmission waveguides have a same symbol. A dispersion value of the dispersion compensation waveguide and the dispersion value of the transmission waveguide have opposite symbols. The two coupling members may have any design in FIG. 5 to FIG. 7, and details are not described herein again.

Different from the embodiments shown in FIG. 5 to FIG. 7, the heating member 801 is added in this embodiment. The heating member 801 is at least in contact with a part of a surface of the dispersion compensation waveguide 202. Specifically, the contact may be direct contact. Alternatively, the contact may be implemented by using other liquid or gas, that is, gas, liquid, or the like passes between the heating member 801 and the part of the surface of the dispersion compensation waveguide 202. For example, a copper heating element is attached to the surface of the waveguide, and electricity is applied to the copper element. Heat emitted by using the copper element may change temperature of the waveguide, thereby changing the dispersion value of the waveguide. In this manner, the temperature of the dispersion compensation waveguide 202 can be changed, thereby changing the dispersion value of the dispersion compensation waveguide 202. A beneficial effect thereof is similar to that of the mechanical displacement control member 701 in FIG. 8. Details are not described herein again.

It should be noted that changing the dispersion value in the foregoing two accompanying drawings may be changing a numerical value without changing a symbol. For example, dispersion is decreased from +10 to +5. Alternatively, changing the dispersion value may be changing both a symbol and a numerical value. For example, dispersion is decreased from +10 to −5. It should be understood that the dispersion value may be specifically increased or decreased. Control needs to be performed based on an actual application requirement. This is not limited in this application.

In addition, the foregoing two manners of changing the dispersion value may also be applied to the transmission waveguide. Specifically, a mechanical displacement control member or a heating member may be disposed on the transmission waveguide of the polymer waveguide.

In the embodiments shown in FIG. 8 and FIG. 9, the polymer waveguide is formed by connecting a plurality of sections of waveguides with complementary dispersion performance, so that dispersion performance of the polymer waveguide is improved, that is, the polymer waveguide has a relatively good dispersion value, and can support a higher data transmission rate. In addition, the mechanical displacement control member or the heating member is introduced, so that the dispersion value of the polymer waveguide can be adjusted in a specific range, thereby providing better application flexibility.

It should be understood that a cross-sectional shape of the polymer waveguide shown in FIG. 2 and FIG. 3 and FIG. 5 to FIG. 9 is not specifically limited in this application. The cross-sectional shape may have a current regular polymer waveguide structure such as a circle, a square, a rectangle, or a split rectangle. Alternatively, as technologies develop, a novel polymer waveguide structure is also applicable to this application. Correspondingly, the diameter mentioned above is a diameter of a circular or circular-like cross-sectional waveguide. A person skilled in the art may learn that if a cross section has another shape, a corresponding description needs to be modified to a description corresponding to a length, a width, or the like. Details are not described herein.

FIG. 10 is a schematic flowchart of an electrical signal transmission method according to an embodiment of this application.

Specifically, the method includes the following steps.

Step 901: Receive an electrical signal from one end of a polymer waveguide, where the polymer waveguide includes a first waveguide and a dispersion compensation waveguide, the first waveguide is connected to the dispersion compensation waveguide, and dispersion symbols of the dispersion compensation waveguide and the first waveguide are opposite.

It should be noted that a medium that is used to transmit an electrical signal and that is mentioned in this step may be further replaced with the polymer waveguide provided in the foregoing another embodiment, and details are not described herein. A device for sending an electrical signal may be a device or an interface described in FIG. 1.

Step 903: Transmit the electrical signal in a transmission direction of the polymer waveguide.

Step 905: Output the electrical signal from the other end of the polymer waveguide.

Specifically, the output electrical signal is received by another device. Specifically, the device may be a device or an interface described in FIG. 1.

Optionally, the foregoing electrical signal transmission method further includes: adjusting a dispersion value of the dispersion compensation waveguide. Specifically, the dispersion value of the dispersion compensation waveguide may be changed by changing a shape of the dispersion compensation waveguide. Alternatively, the dispersion value of the dispersion compensation waveguide may be changed by heating the dispersion compensation waveguide.

Optionally, the foregoing electrical signal transmission method further includes: replacing the first waveguide with another waveguide. A purpose thereof is to change a total dispersion value of the polymer waveguide to meet a dispersion performance requirement in actual application.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A polymer waveguide, comprising:
   a first waveguide;
   a dispersion compensation waveguide, wherein the first waveguide is connected to the dispersion compensation waveguide, and wherein a dispersion value of the dispersion compensation waveguide is a positive value and a dispersion value of the first waveguide is a negative value, or the dispersion value of the dispersion compensation waveguide is the negative value and the dispersion value of the first waveguide is the positive value; and a mechanical displacement control, wherein the dispersion compensation waveguide is in contact with the mechanical displacement control, and wherein the mechanical displacement control is configured to change the dispersion value of the dispersion compensation waveguide.

2. The polymer waveguide according to claim 1, wherein the polymer waveguide further comprises a second waveguide, the second waveguide is connected to the dispersion compensation waveguide, and wherein the dispersion value of the first waveguide and a dispersion value of the second waveguide are both positive values or both negative values.

3. The polymer waveguide according to claim 2, wherein the dispersion compensation waveguide comprises a plurality of waveguides connected in parallel or a plurality of waveguides connected in series.

4. The polymer waveguide according to claim 1, wherein the dispersion compensation waveguide comprises a plurality of waveguides connected in parallel or a plurality of waveguides connected in series.

5. The polymer waveguide according to claim 1, wherein at least one end of the dispersion compensation waveguide comprises a coupling part, and the coupling part is configured to couple the dispersion compensation waveguide to a waveguide adjacent to the dispersion compensation waveguide.

6. The polymer waveguide according to claim 1, wherein the polymer waveguide further comprises a coupling member, and the first waveguide and the dispersion compensation waveguide are connected to each other using the coupling member.

7. The polymer waveguide according to claim 6, wherein the first waveguide, the dispersion compensation waveguide, and the coupling member are integrally connected, and the coupling member has a shape-tapered or structure-tapered design.

8. The polymer waveguide according to claim 7, wherein the coupling member has a detachable structure.

9. A method, comprising:
receiving an electrical signal from a first end of a polymer waveguide, wherein the polymer waveguide comprises a first waveguide, a dispersion compensation waveguide, and a mechanical displacement control in contact with the dispersion compensation waveguide, wherein the mechanical displacement control is configured to change a dispersion value of the of the dispersion compensation waveguide, and wherein the first waveguide is connected to the dispersion compensation waveguide, and wherein a dispersion value of the dispersion compensation waveguide is a positive value and a dispersion value of the first waveguide is a negative value, or the dispersion value of the dispersion compensation waveguide is the negative value and the dispersion value of the first waveguide is the positive value;
transmitting the electrical signal in a transmission direction of the polymer waveguide; and
outputting the electrical signal from a second end of the polymer waveguide.

10. The method according to claim 9, further comprising:
adjusting the dispersion value of the dispersion compensation waveguide.

11. The method according to claim 10, wherein adjusting the dispersion value of the dispersion compensation waveguide comprises:
changing a shape of the dispersion compensation waveguide via the mechanical displacement control to change the dispersion value of the dispersion compensation waveguide.

12. The method according to claim 10, wherein the first waveguide is connected to the dispersion compensation waveguide by a coupling member.

13. The method according to claim 12, wherein the first waveguide, the dispersion compensation waveguide, and the coupling member are integrally connected, and the coupling member has a shape-tapered or structure-tapered design.

14. The method according to claim 12, wherein the coupling member has a detachable structure.

15. A system, comprising:
a first apparatus;
a second apparatus; and
a polymer waveguide, wherein the first apparatus and the second apparatus are connected using the polymer waveguide, and wherein:
the polymer waveguide comprises a first waveguide, a dispersion compensation waveguide, and a mechanical displacement control;
the first waveguide is connected to the dispersion compensation waveguide;
a dispersion value of the dispersion compensation waveguide is a positive value and a dispersion value of the first waveguide is a negative value, or the dispersion value of the dispersion compensation waveguide is the negative value and the dispersion value of the first waveguide is the positive value; and
wherein the dispersion compensation waveguide is in contact with the mechanical displacement control, and wherein the mechanical displacement control is configured to change the dispersion value of the dispersion compensation waveguide.

16. The system according to claim 15, wherein the polymer waveguide further comprises a coupling member, and the first waveguide and the dispersion compensation waveguide are connected by the coupling member.

17. The system according to claim 16, wherein the coupling member has a shape-tapered or structure-tapered design.

* * * * *